United States Patent

O'Sickey

[11] 3,888,521

[45] June 10, 1975

[54] TUBE COUPLING AND FERRULE THEREFOR

[75] Inventor: Lawrence B. O'Sickey, University Heights, Ohio

[73] Assignee: Parker-Hannifin Corporation, Cleveland, Ohio

[22] Filed: July 11, 1973

[21] Appl. No.: 378,332

[52] U.S. Cl. ............................... 285/341; 285/342
[51] Int. Cl. .......................................... F16l 19/08
[58] Field of Search ................. 285/341, 342, 382.7

[56] References Cited
UNITED STATES PATENTS

| | | | |
|---|---|---|---|
| 2,201,404 | 5/1940 | Kreidel | 285/341 X |
| 2,230,116 | 1/1941 | Kreidel | 285/342 |
| 2,343,922 | 3/1944 | Parker | 285/342 X |
| 2,496,510 | 2/1950 | Wolfram | 285/341 X |
| 3,248,136 | 4/1966 | Brozek et al. | 285/341 |
| 3,499,671 | 3/1970 | Osborne | 285/341 |
| 3,708,186 | 1/1973 | Takagi | 285/382.7 |

Primary Examiner—Richard J. Scanlan, Jr.
Assistant Examiner—Peter Nerbun
Attorney, Agent, or Firm—John N. Wolfram

[57] ABSTRACT

A tube coupling and a ferrule therefor in which the ferrule has forward and rear conical portions radially contractible against a tube by respective engagement with conical body and nut surfaces, the conical nut surface and the rear conical ferrule portion each having a greater included angle than the conical body surface and the forward conical ferrule portion, the rear conical ferrule portion being of generally thinner wall thickness than the forward conical portion. The ferrule may also have a layer of material on its inner surface that is harder than the material of the ferrule.

4 Claims, 4 Drawing Figures

PATENTED JUN 10 1975  3,889,521

TUBE COUPLING AND FERRULE THEREFOR

BACKGROUND OF THE INVENTION

In flareless fittings of the bite type, as generally exemplified by U.S. Letters Pat. 3,499,671, a tube is bottomed against a shoulder in the coupling body and a ferrule is driven by a nut along the tube as the front end of the ferrule is cammed radially inwardly against the tube by contact with a conical surface of the body. As the ferrule moves axially along the tube, the front end of the ferrule cuts or bites its way into the wall of the tube to provide gripping and sealing engagement therewith, the material of the tube being thrown up ahead of the ferrule so as to provide a positive holding shoulder. During the cutting action of the ferrule into the tube, the portion of the tube between its inner end where it is bottomed against a body shoulder and the forward end of the ferrule is subjected to considerable axial compression. This frequently results in an outward expansion of this portion of the tube which causes it to lock or bind against the surrounding wall of the body bore in which it is received. Such binding is objectionable because it interferes with ready withdrawal of the tube from the body when the joint is disassembled.

SUMMARY OF THE INVENTION

The present invention provides a tube coupling and ferrule construction with which binding of the tube within the body bore is eliminated. This is accomplished by stamping the ferrule out of sheet material and providing forward and rear conical portions respectively engageable with tapered surfaces in the body and nut for contraction thereby against the tube. As the ferrule moves forward on the tube during assembly, the forward end cuts its way into the tube and applies compressive stress to the tube portion forwardly thereof, in the same manner as in prior couplings of this same general type. As the rear conical portion moves forwardly, it also tends to drive the tube forwardly before it. However, part of the forward driving force on the tube by the rear portion of the ferrule is absorbed by the grip of the front conical portion on the tube so that there is less axial compressive force on the portion of the tube forward of the front edge of the ferrule than occurs when all or most of the gripping force on the tube is provided only at the front end of the ferrule.

In order to obtain a satisfactory balance between the gripping action at the front and rear portions of the ferrule so as to provide sufficient holding and sealing force at the front end without imposing enough axial compressive stress on the forward end of the tube so as to cause binding in the body bore, the ferrule of the present invention is made with the wall thickness of the rear portion generally thinner than the wall thickness of the forward portion. This makes radial contraction of the rear ferrule portion easier to accomplish so as to compensate for the smaller radial force component exerted by the flatter conical surface of the nut against the rear ferrule portion than the radial force component exerted against the front end of the ferrule by the steeper taper of the body. It is desirable to have the body taper steeper than that of the nut so that the ferrule and tube will not tend to turn relative to the body as the nut is tightened.

The invention also provides for cladding the front and interior surface of the ferrule with a relatively thin layer of material that is harder than the main portion of the ferrule. This insures a hard and sharp cutting edge at the front end of the ferrule for cutting its way into the tube.

DETAIL DESCRIPTION

FIG. 1 is a partial axial cross section through a prior art coupling disclosed in U.S. Letters Pat. No. 3,499,671.

Figure 1:
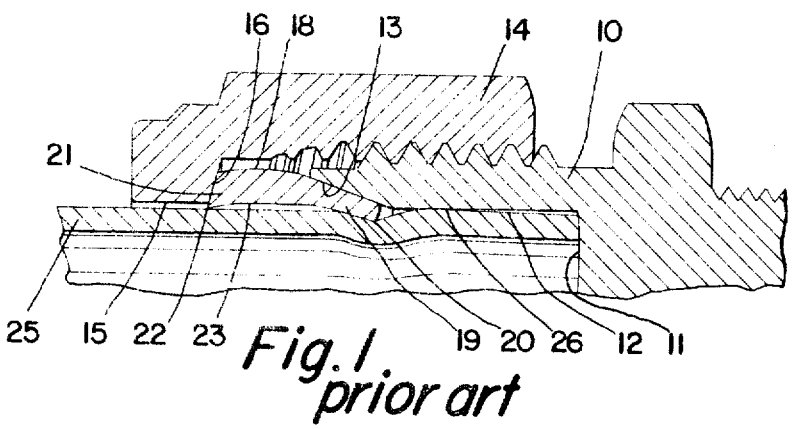

In the prior art form of coupling shown in FIG. 1, the coupling includes a body 10 having a shoulder 11, a bore 12 and flare mouth 13. Threaded to the body is a nut 14 having a bore 15 and a tapered shoulder 16. Between the nut and body is a ferrule 18 that has a front portion 19 with a sharp edge 20 and a rear portion 21 with an internal corner 22 and a bore 23. Initially, bore 23 is straight through and corners 20 and 22 are slightly spaced from the tube 25. Upon threading of the nut upon the body the nut shoulder 16 drives the ferrule against body tapered surface 13 to contract the cutting edge 20 to the position as shown. As the ferrule is moved forward, the nut edge 20 cuts its way into the tube and puts the forward end of the tube under considerable axial compressive stress which causes the same to bulge outwardly into contact with body bore 12 as at 26 with sufficient force so that in many cases it is difficult to remove the tube from the body upon disassembly of the joint. As the ferrule is moved forward, the tapered nut surface 16 cams the rear portion of the ferrule inward a slight amount so that ferrule edge 22 contacts the tube as shown, but this contact is generally not enough to significantly modify the compressive force applied to the portion of the tube forward of the front end of the ferrule so that the latter then bulges out as aforesaid.

Figure 2:
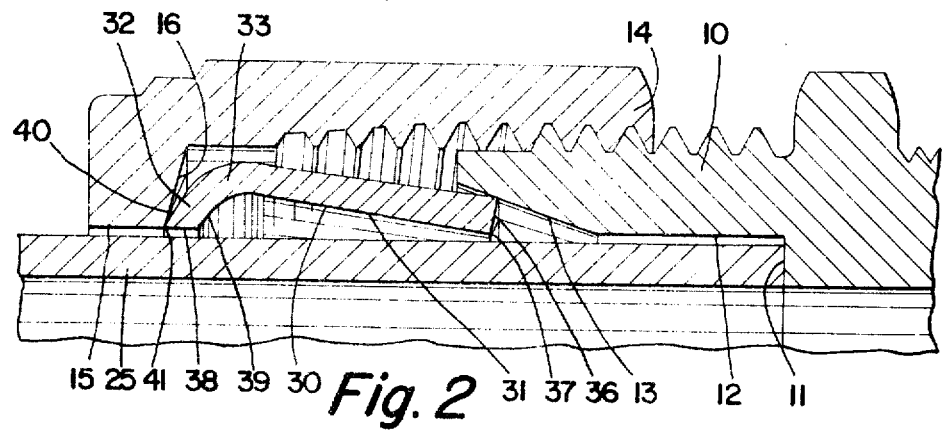
FIG. 2 is an axial partial cross section of the coupling with the parts in loose assembled position.
Figure 3:
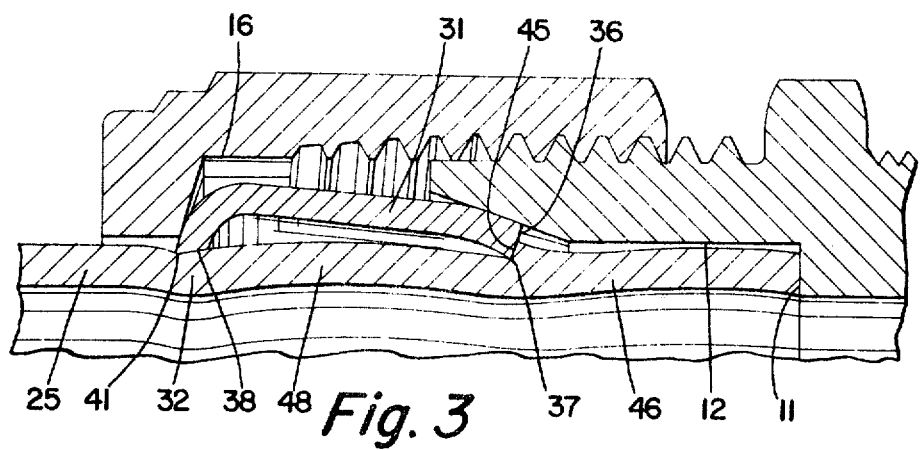
FIG. 3 is a view like FIG. 2 showing the parts in tightly assembled position.

In the present invention, as illustrated in FIGS. 2 and 3, the body and nut may be identical to that of FIG. 1 and thus these parts are supplied with like reference numerals. However, a different sleeve 30 is provided. This sleeve is stamped from sheet stock and comprises a forward conical portion 31, a rear conical portion 32 and an intermediate curve portion 33 whose inner and outer surfaces blend tangentially with the inner and outer surfaces of portions 31 and 32.

As initially stamped, ferrule 31 is of substantially uniform thickness throughout but is is subsequently machined so that the wall thickness of the front portion 31 gradually diminishes in a direction toward intermediate portion 33 and portions 32 and 33 are of substantially uniform thickness corresponding to the thinnest part of portion 31.

The front end 36 of the ferrule is substantially at right angles to the outer conical surface of portion 31 and meets the inner conical surface to form a sharp edge 37. The rear portion 32 is trimmed so that its smaller diameter is in the form of a cylindrical surface 38 which forms an obtuse angle with inner surface 39 and an acute angle with outer surface 40.

In a typical embodiment, as for example for a coupling to fit a ⅜ inch OD tube, body surface 13 may lie at an angle of about 20° with respect to the longitudinal axis of the coupling and nut surface 16 may be at an angle of 75° with respect to such axis. For this size coupling the included angle for the outer conical surface of portion 31 may be 15° and the included angle for the outer conical surface of portion 32 may be 60°. The overall length of the ferrule may be 0.260 inch, the wall thickness at front end 36 may be 0.030 inch and the wall thickness of portions 32 and 33 and of portion 31 where it merges with portion 33 may be 0.025 inch. The initial clearance of sharp edge 37, cylindrical surface 38 and bore 12 with the outside diameter of tube 25 may be about 0.004 inch.

For a coupling to be used with a tube 25 of stainless steel, the body 10 and nut 14 may be of American Iron and Steel Institute (AISI) 316 stainless steel and ferrule 30 may be of Armco Steel Corporation 17–4PH stainless steel hardened to 40 Rockwell C.

Upon tightening of the nut upon the body, nut shoulder 16 will engage ferrule rear portion 32 and drive the ferrule forwardly along the tube so that the front end of the ferrule is radially contracted by body cam surface 13 whereby sharp edge 37 cuts its way into the tube to form a holding shoulder 45 thereon as shown in FIG. 3. As the ferrule thus cuts its way into the tube, the portion 46 of the tube forwardly of ferrule front end 36 is subjected to axial compressive stress tending to outwardly bulge the same.

As the front end of the ferrule cuts its way deeper and deeper into the tube the resistance of the ferrule to forward motion increases. This causes nut shoulder 16 to bear harder and harder upon the corner 41 of the ferrule outer portion 32 and bend the latter radially and axially inwardly to the position shown in FIG. 3 where surface 38 has indented the tube so as to have a firm grip thereon.

The axially inward motion of ferrule outer portion 32 after it has engaged tube 25 tries to move the latter inwardly. Part of this inward motion is resisted by the grip that the front end of the ferrule has achieved upon the tube and thus there is a tendency for the portion of the tube 28 between ferrule front edge 37 and rear portion 32 to bulge outwardly as shown in FIG. 3. This effectively reduces the amount of axial compression exerted against the inner portion 46 of the tube so that the latter does not bulge outwardly into tight binding contact with body bore 12.

In the normal tightened condition, part of the forward ferrule portion 31 is deformed to conform in angle with the angle of body bore 13 and a substantial part of ferrule rear portion 32 is conformed with the angle of nut shoulder 16. Also, surface 38, which was initially cylindrical as shown in FIG. 2, assumes a slightly conical position as shown in FIG. 3 so that the deepest indentation of the tube is at the outermost corner 41.

Figure 4:
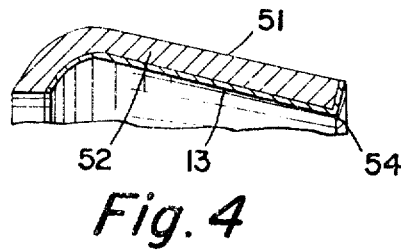
FIG. 4 is a partial view in cross section showing a modified form of the ferrule.

In the modified form of the ferrule as shown in FIG. 4, the ferrule 51 has a main portion 52 of one material which is provided with a clad coating 53 of a harder material. Thus, the main portion 52 may be of 316 stainless steel and the clad coating 53 may be of 17–4PH stainless steel hardened to a Rockwell of from C-40 to C-44.

Main body 52 is thus of springy yet bendable and deformable material and clad coating 53 provides hardness for effecting a hard and sharp cutting edge 54. The ferrule is formed so that the composite construction with the clad coating 53 has the same initial dimensions and contour as ferrule 30 and functions in the same manner.

A coupling for ⅜ inch OD stainless steel tubing of 0.065 inch wall was tested to 2,000 PSI nitrogen with no leakage and when subjected to a burst test did not pull out of the coupling when the tube burst at 33,000 PSI. Also, no breakage of the tube or leakage occurred through 10,000,000 cycles of impulse testing at 0 to 28,000 PSI. The front portion of the tube bulged slightly but the tube was easily removable from the body.

I claim:

1. A tube coupling ferrule of thin wall having a forward and a rear portion the forward portion having radially inner and outer conical surfaces of different conicity that extend from smaller diameters at the forward terminal end of the ferrule to larger diameters toward the rear portion and which gradually converge toward each other in the direction toward their larger diameters whereby the thickness of the forward portion is least at such larger diameters, said rear portion having generally conical radially inner and outer surfaces that extend from smaller diameters at the rear terminal end of the ferrule to larger diameters toward the forward portion, said ferrule also having curved radially inner and outer surfaces that respectively join said inner surfaces and said outer surfaces at said larger diameters, said curved portion being of substantially uniform but thinner wall thickness than the major part of said forward conical portion.

2. The ferrule of claim 1 in which the rear portion has a cylindrical surface extending across the wall thickness of said rear portion so as to directly intersect said inner and outer conical surfaces of said rear portion at their small diameters.

3. A coupling for tubes comprising a body having a bore receiving a tube and a flare mouth leading to the bore, a nut threaded onto the body and having a bore that receives the tube and having a tapered shoulder axially opposite the flare mouth, the flare mouth and tapered shoulder being tapered toward each other in a radially outward direction, a ferrule between the nut and body and having a forward conical portion engageable with the flare mouth and a rear generally conical portion engageable with the tapered shoulder, said conical portions each being of less included angle than the included angle of the respective flare mouth and tapered shoulder with which it engages whereby initial contact with the respective flare mouth and tapered shoulder is adjacent the small diameter ends of the conical portions, and each of said conical portions being radially contractable by such respective engagement into engagement with the tube, the forward portion having radially inner and outer conical surfaces of different conicity that extend from smaller diameters at the forward terminal end of the ferrule to larger diameters toward the rear portion and which gradually converge toward each other in the direction toward their larger diameters whereby the thickness of the forward portion is least at such larger diameters, said rear portion having generally conical radially inner and outer surfaces that extend from smaller diameters at the rear terminal end of the ferrule to larger diameters toward the forward portion, said ferrule also having curved radially inner and outer surfaces that respectively join said inner surfaces and said outer surfaces at said larger diameters, said curved portion being of substantially uniform but thinner wall thickness than the major part of said forward conical portion and said rear and forward conical portions when contracted into engagement with the tube having their large diameter ends out of contact with said tapered shoulder and said flare mouth.

4. The coupling of claim 3 in which said rear conical portion initially has a cylindrical surface at its small diameter that directly intersects said inner and outer surfaces of said rear portion.

* * * * *